(12) United States Patent
Yoon (10) Patent No.: US 11,799,121 B2
(45) Date of Patent: Oct. 24, 2023

(54) SYSTEM FOR ASSEMBLING BATTERY MODULE

(71) Applicants: HYUNDAI MOTOR COMPANY, Seoul (KR); KIA CORPORATION, Seoul (KR)

(72) Inventor: Hyunjun Yoon, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 212 days.

(21) Appl. No.: 17/332,032

(22) Filed: May 27, 2021

(65) Prior Publication Data

US 2022/0109177 A1  Apr. 7, 2022

(30) Foreign Application Priority Data

Oct. 7, 2020 (KR) .................. 10-2020-0129627

(51) Int. Cl.
*H01M 10/04* (2006.01)
*H01M 10/0585* (2010.01)
*H01M 50/54* (2021.01)

(52) U.S. Cl.
CPC ... *H01M 10/0404* (2013.01); *H01M 10/0585* (2013.01); *H01M 50/54* (2021.01)

(58) Field of Classification Search
CPC ......... H01M 10/0404; H01M 10/0409; H01M 10/4221; H01M 10/28; H01M 10/12; H01M 10/30; H01M 10/04; H01M 10/0585; H01M 6/005; H01M 50/02

See application file for complete search history.

(56) References Cited

U.S. PATENT DOCUMENTS

| | | | | |
|---|---|---|---|---|
| 2013/0280591 A1* | 10/2013 | Kim | ............. | H01M 50/124 429/160 |
| 2014/0101929 A1* | 4/2014 | Kim | ............. | H01M 6/00 29/623.1 |
| 2021/0013481 A1* | 1/2021 | Kuwata | ............. | H01M 10/0404 |

FOREIGN PATENT DOCUMENTS

| | | | |
|---|---|---|---|
| CN | 1713446 A | * | 12/2005 |
| KR | 20180071481 A | * | 6/2018 |

* cited by examiner

*Primary Examiner* — Matthew T Martin
*Assistant Examiner* — Grace Ann Kenlaw
(74) *Attorney, Agent, or Firm* — MCDONNELL BOEHNEN HULBERT & BERGHOFF LLP (57) ABSTRACT

A system for assembling a battery module includes a battery cell supply unit, a transfer unit, and a battery cell adhesion unit, where the battery cell supply unit is configured to stack a plurality of battery cells each being formed by packaging of a negative electrode plate having a negative electrode terminal, a positive electrode plate having a positive electrode terminal, and a separator interposed between the negative electrode plate and positive electrode plate, by an exterior member, the transfer unit is configured to adsorb and transfer the battery cell from the battery cell supply unit, and the battery cell adhesion unit is configured to apply an adhesive to an adhesion surface of the battery cell transferred by the transfer unit, and to conjoin the battery cells while stacking the battery cells in stacking device such that the adhesion surfaces of the battery cells face a preset direction.

10 Claims, 6 Drawing Sheets

SYSTEM FOR ASSEMBLING BATTERY MODULE

CROSS REFERENCE TO RELATED APPLICATIONS

This application claims priority to and the benefit of Korean Patent Application No. 10-2020-0129627 filed in the Korean Intellectual Property Office on Oct. 7, 2020, the entire contents of which are incorporated herein by reference.

BACKGROUND (a) Field

The present disclosure relates to a system for assembling a battery module.

(b) Description of the Related Art

Currently commercially available secondary batteries include nickel cadmium batteries, nickel hydrogen batteries, nickel zinc batteries, and lithium secondary batteries.

Among them, a lithium rechargeable battery has been widely used because it is freely charged and discharged owing to almost no memory effect compared with the nickel-based rechargeable battery, and has a very low self-discharge rate, a high operating voltage, and high energy density per unit weight.

Such lithium secondary batteries typically use lithium-based oxides and carbon materials as positive electrode active materials and negative electrode active materials, respectively.

The lithium secondary battery includes an electrode assembly and an exterior member (e.g., a battery case) that seals the electrode assembly with the electrolyte solution. A typical electrode assembly includes a positive electrode plate coated with a positive electrode active material, a negative electrode plate coated with a negative electrode active material, and a separator disposed between positive and negative electrode plates.

The battery cell may be classified, according to a shape of the exterior member, into a can-type secondary battery in which an electrode assembly is installed in a metal can, and a pouch-type secondary battery in which an electrode assembly is installed in a pouch of a laminate sheet of aluminum and polymer.

Recently, secondary batteries have been widely used not only for small devices such as portable electronic devices but also for medium and large devices such as automobiles and power storage devices.

When used in such medium and large devices, a large number of secondary battery cells are electrically interconnected to increase capacity and output.

In particular, the pouch-type secondary battery is widely used in such medium and large devices because of its merit of easy stacking and light weight.

However, the pouch-type secondary battery generally does not have a large mechanical strength, and the battery itself does not contain a structure for bonding to each other, making it difficult to stack.

Therefore, when configuring a battery module by including a plurality of pouch-type secondary batteries, in order to prevent interior fluid flow while protecting the battery module from external impacts, employing of separate coupling members is required in addition to coupling between the battery cells and electrical connections between bus bars and the like.

In the case of an existing method of configuring a battery module, the battery cells are stacked, for example, by applying surface pressure by designing the edges of the battery cell to overlap.

According to such an existing configuration of the battery module, when external vibration is applied, the battery cell shakes and the mechanical impact is transferred to the electrode tab drawn out from the battery cell and the electrode lead connected thereto, which disadvantageously affects the electrical connection state.

As such, according to the existing battery module configuration, the product quality may be deteriorated because the bonding of the battery cell is formed only at the edge or the bonding is not uniform.

The above information disclosed in this Background section is only for enhancement of understanding of the background of the disclosure and therefore it may contain information that does not form the prior art that is already known in this country to a person of ordinary skill in the art.

SUMMARY

A system for assembling a battery module includes a battery cell supply unit configured to stack a plurality of battery cells each being formed by packaging of a negative electrode plate having a negative electrode terminal, a positive electrode plate having a positive electrode terminal, and a separator interposed between the negative electrode plate and positive electrode plate, by an exterior member, a transfer unit configured to adsorb and transfer the battery cell from the battery cell supply unit, and a battery cell adhesion unit configured to apply an adhesive to an adhesion surface of the battery cell transferred by the transfer unit, and to conjoin the battery cells while stacking the battery cells in stacking device such that the adhesion surfaces of the battery cells face a preset direction.

The battery cell supply unit may include at least one loading frame on which the plurality of battery cells are seated such that the adhesion surface face upward, a height adjusting device disposed below the loading frame, and configured to operate vertically at a central portion under the loading frame, to adjust a loading height of the battery cell, a detecting sensor disposed on a first side of the loading frame, and configured to detect a loading position of the battery cell, and a barcode reading sensor disposed on a second side of the loading frame, and configured to recognize barcode of the battery cell.

The transfer unit may include an adsorber configured to vacuum adsorb the battery cell stored in the battery cell supply unit, a vertical motor connected to the adsorber through a vertical shaft and configured to vertically move the adsorber, a first rail on which the vertical motor is slidably mounted through a motor bracket, and that may be configured to reciprocally move the adsorber together with the vertical motor in a first horizontal direction, and a second rail disposed at both end portions of the first rail, and configured to reciprocally move the first rail in a second horizontal direction.

The battery cell adhesion unit may include a rotation frame on which the battery cells transferred by the transfer unit are firmly seated, and that may be configured to slide and rotate to transfer the battery cell to a preset position, an applier disposed on the rotation frame, and configured to apply the adhesive to the adhesion surface of the battery cell fixed to the rotation frame by a nozzle, and a stacking device configured to stack the battery cells while the battery cells are supported by a fixed plate and the adhesion surfaces of the battery cells face a preset direction by sliding and rotating of the rotation frame.

The rotation frame may include a seating plate on which the battery cell is seated, and clampers configured to clamp the battery cell at a circumference of the seating plate, wherein the rotation frame may be configured to be slidable on a third rail formed along the applier and the stacking device.

The rotation frame may be configured to rotate by 90° by a rotation motor configured on both sides.

The applier may be connected to an adhesive storage unit configured to store the adhesive to be supplied to the battery cell adhesion unit, and may be configured to be slidable on a fourth rail disposed along a length direction of the rotation frame.

The adhesive storage unit may include a storage tank configured to store the adhesive and provided with a temperature controller for maintaining a constant temperature of the adhesive, a supply hose disposed between the storage tank and the nozzle to supply the adhesive to the nozzle, and provided with another temperature controller for maintaining the constant temperature of the adhesive, and a supply pump installed on the supply hose, and configured to supply the adhesive to the nozzle by a preset amount.

The stacking device may further include a pressurizing device configured to pressurize the battery cell toward the fixed plate while moving in front and rear directions with respect to the fixed plate.

The system may further include a pad supply unit configured to operate in front and rear directions with respect to the battery cell supply unit, and store pads to be attached between the battery cells.

The pad supply unit may include a movable plate configured to operate in the front and rear directions on a fifth rail with respect to the battery cell supply unit, and a plurality of pad storages configured to store the pads are disposed in parallel on an upper surface of the movable plate.

According to a system for assembling a battery module according to an exemplary embodiment, by supplying a precise amount of the adhesive corresponding to a preset amount, the adhesive may be uniformly applied, thereby improving the marketability.

According to the system for assembling a battery module, by applying the adhesive in the required amount according to the required area, there is an advantage in quality management by maintaining a uniform quality.

According to a system for assembling a battery module according to an exemplary embodiment, when the adhesive is insufficient, by replacing the storage tank storing the adhesive, or by filling the storage tank with the adhesive, the replacement time of consumable materials may be reduced and production efficiency may be increased.

Further, effects that can be obtained or expected from exemplary embodiments of the present disclosure are directly or suggestively described in the following detailed description. That is, various effects expected from exemplary embodiments of the present disclosure will be described in the following detailed description.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not related to the description will be omitted, and the same elements or equivalents are referred to with the same reference numerals throughout the specification.

In the following description, dividing names of components into first, second, and the like is to divide the names because the names of the components are the same as each other, and an order thereof is not particularly limited.

Figure 1:
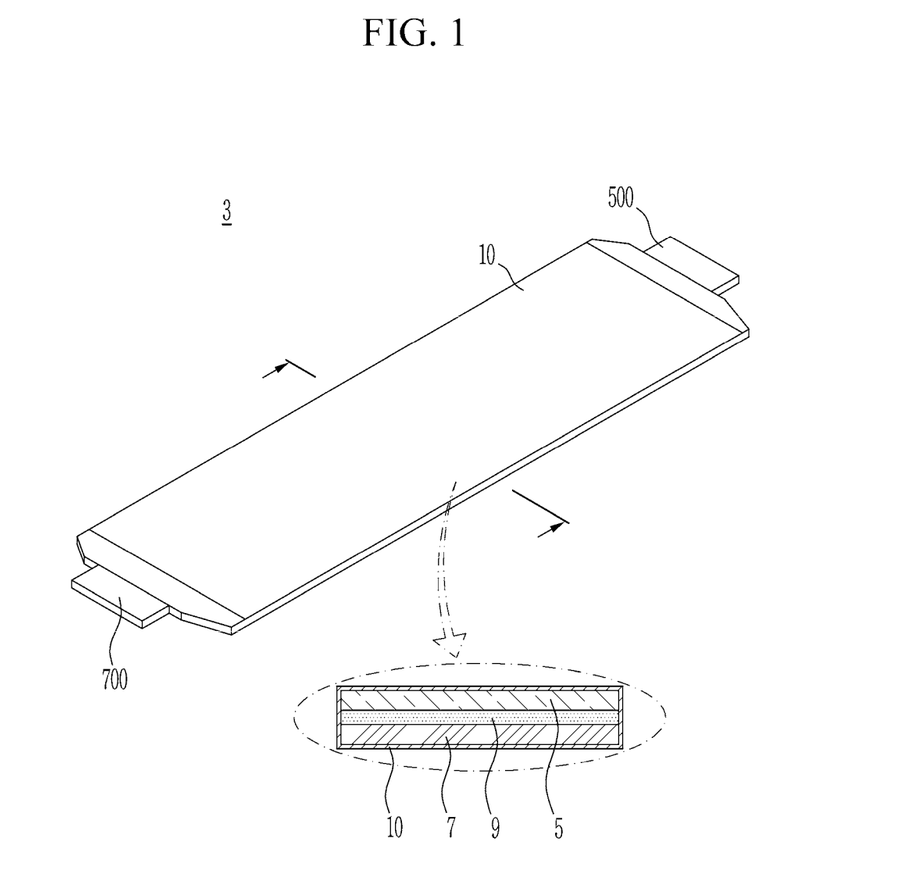
FIG. 1 is a schematic diagram of a battery cell applied to a system for assembling a battery module according to an exemplary embodiment.
Figure 2:
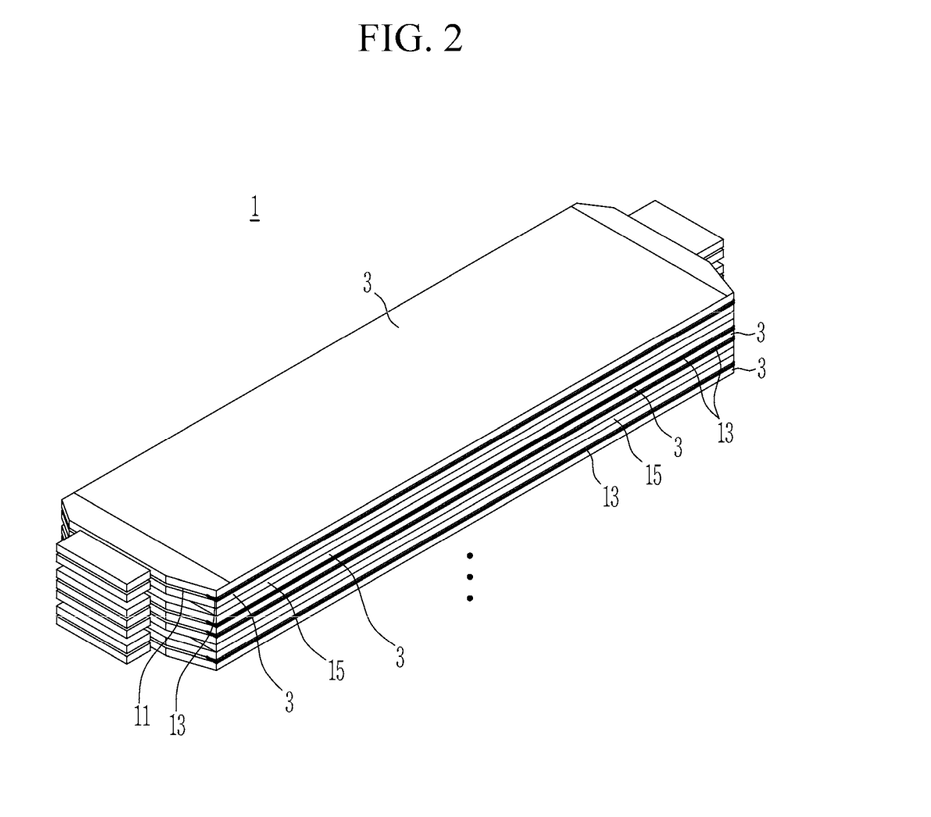
FIG. 2 is a schematic diagram of a battery module manufactured by a system for assembling a battery module according to an exemplary embodiment.
Figure 3:
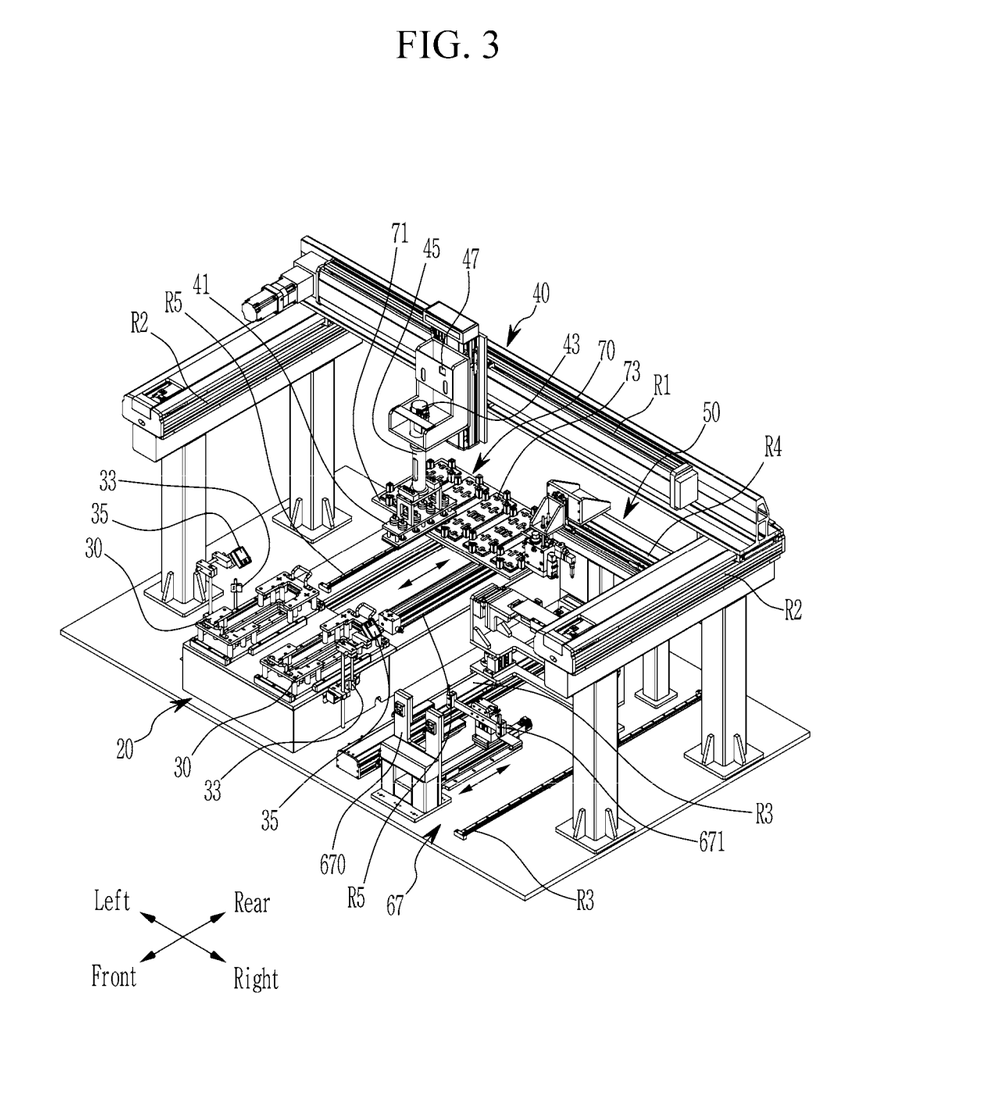
FIG. 3 is a schematic diagram of an entire system for assembling a battery module according to an exemplary embodiment.

FIG. 1 is a schematic diagram of a battery cell applied to a system for assembling a battery module according to an exemplary embodiment. FIG. 2 is a schematic diagram of a battery module manufactured by a system for assembling a battery module according to an exemplary embodiment. FIG. 3 is a schematic diagram of an entire system for assembling a battery module according to an exemplary embodiment.

Referring to FIG. 1 and FIG. 2, a battery cell 3 applied to a system for assembling a battery module according to an exemplary embodiment includes a negative electrode plate 5 having a negative electrode terminal 500, a positive electrode plate 7 having a positive electrode terminal 700, and a separator 9 interposed between the negative electrode plate 5 and the positive electrode plate 7, which are overlapped and packaged by an exterior member 10.

In addition, a battery module 1 includes a stack of a plurality of such battery cells 3, which are electrically interconnected.

A system for assembling the battery module 1 according to an exemplary embodiment may be adopted to stack the battery cells 3 by adding an adhesive 13 between the battery cells 3.

In addition, a system for assembling a battery module according to an exemplary embodiment may be adopted to optionally include a pad 15 between the battery cells 3 in order to prevent swelling of the battery cell 3.

For example, the pad 15 may be applied when every pair of the battery cells 3 are overlapped.

For such a purpose, referring to FIG. 3, the system for assembling a battery module includes a battery cell supply unit 20, a transfer unit 40, a battery cell adhesion unit 50, an adhesive storage unit 60, and a pad supply unit 70.

In an exemplary embodiment, front and rear, left and right, and vertical directions are set with reference to FIG. 3.

The above definition of reference directions has relative meanings, and may not necessarily limited thereto since directionality may vary depending on reference positions of the exemplary system or constituent parts employed therein The battery cell supply unit 20 and the battery cell adhesion unit 50 are disposed in the left and right directions. The pad supply unit 70 is disposed at a rear of the battery cell supply unit 20. The transfer unit 40 is configured to move in all directions at above the battery cell supply unit 20, the battery cell adhesion unit 50, and the pad supply unit 70.

Figure 4:
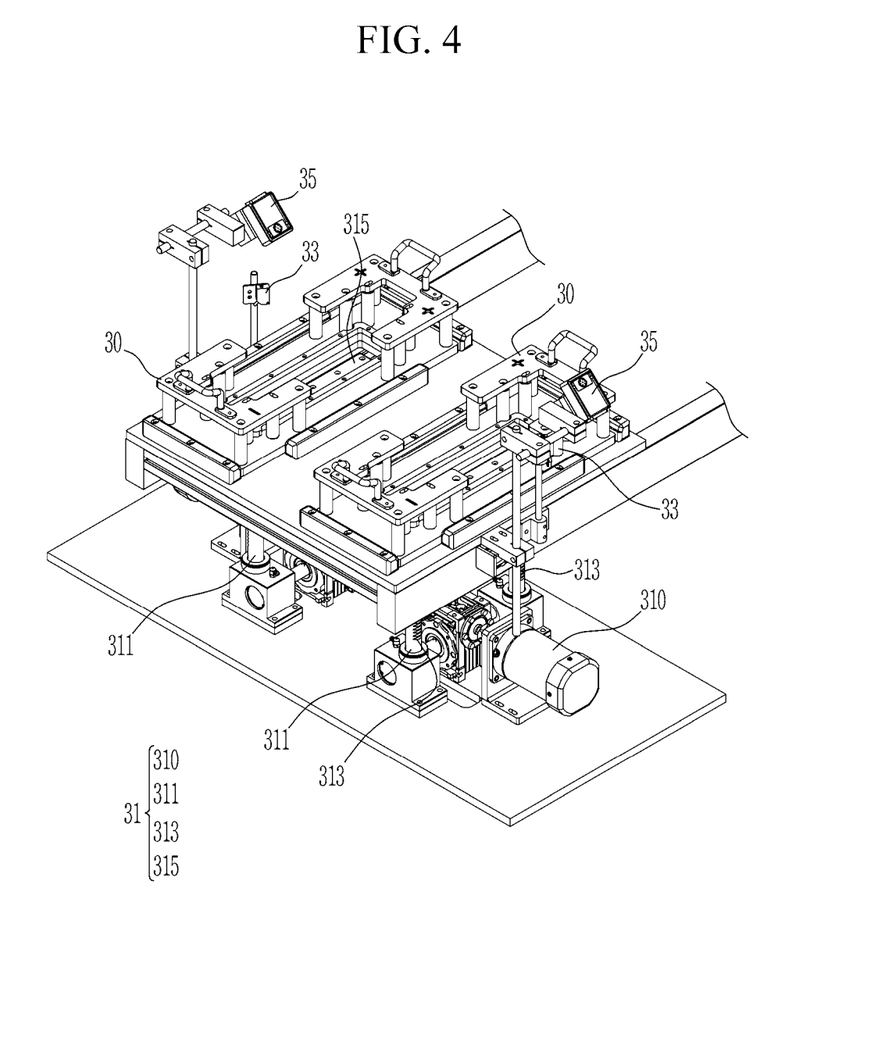
FIG. 4 is a schematic diagram of a battery cell supply unit applied to a system for assembling a battery module according to an exemplary embodiment.

FIG. 4 is a schematic diagram of a battery cell supply unit 20 applied to a system for assembling a battery module according to an exemplary embodiment.

Referring to FIG. 4, the battery cell supply unit 20 may be loaded with and stack a plurality of battery cells 3 depending to the types.

At this time, the battery cell 3 may be stacked such that an adhesion surface 11 faces upward.

For such a purpose, the battery cell supply unit 20 includes at least one loading frame 30 on which the plurality of battery cells 3 are seated.

A height adjusting device 31 is disposed below the loading frame 30.

The height adjusting device 31 is configured to vertically operation at a central portion under the loading frame 30, to adjust the loading height of the battery cell 3.

The height adjusting device 31 includes a drive shaft 311 connected to a first motor 310 disposed below the loading frame 30 and an adjustment plate 315 connected to the drive shaft 311 and configured to support the battery cell 3.

A plurality of tabs 313 are formed on an exterior surface of the drive shaft 311 such that the height of the adjustment plate 315 may be adjusted stepwise.

In addition, a detecting sensor 33 configured to the detect loading position of the battery cell 3 is arranged on a first side of the loading frame 30.

The position where the battery cell 3 is loaded may be sensed by the detecting sensor 33.

A barcode reading sensor 35 configured to recognize barcode of the battery cell 3 is provided on a second side of the loading frame 30.

The type of the battery cell 3 may be sensed by the barcode reading sensor 35.

In addition, in an exemplary embodiment, the transfer unit 40 is configured to adsorb and transfer the battery cell 3 from the battery cell supply unit 20.

The transfer unit 40 includes an adsorber 41 that vacuum adsorbs the battery cell 3.

The adsorber 41 may contact and vacuum adsorb the adhesion surface 11 of the battery cell 3 stacked in the battery cell supply unit 20.

The adsorber 41 is connected to a vertical motor 43 through a vertical shaft 45 and configured to vertically move by the vertical motor 43.

In addition, the vertical motor 43 may be mounted on a first rail R1 through a motor bracket 47.

The vertical motor 43 is slidably mounted on the first rail R1, and is configured to reciprocally move, together with the adsorber 41, in a first horizontal direction on the first rail R1.

Specifically, the adsorber 41 together with the vertical motor 43 may slide on the first rail R1 in the left and right directions.

A second rail R2 is disposed at both end portions of the first rail R1.

The second rail R2 may reciprocally move the first rail R1 together with the adsorber 41 in a second horizontal direction.

For example, as the first rail R1 is moved by the second rail R2, the adsorber 41 may move in the front and rear directions.

By such configurations, the adsorber 41 may move in all directions by the first rail R1 and the second rail R2.

Figure 5:
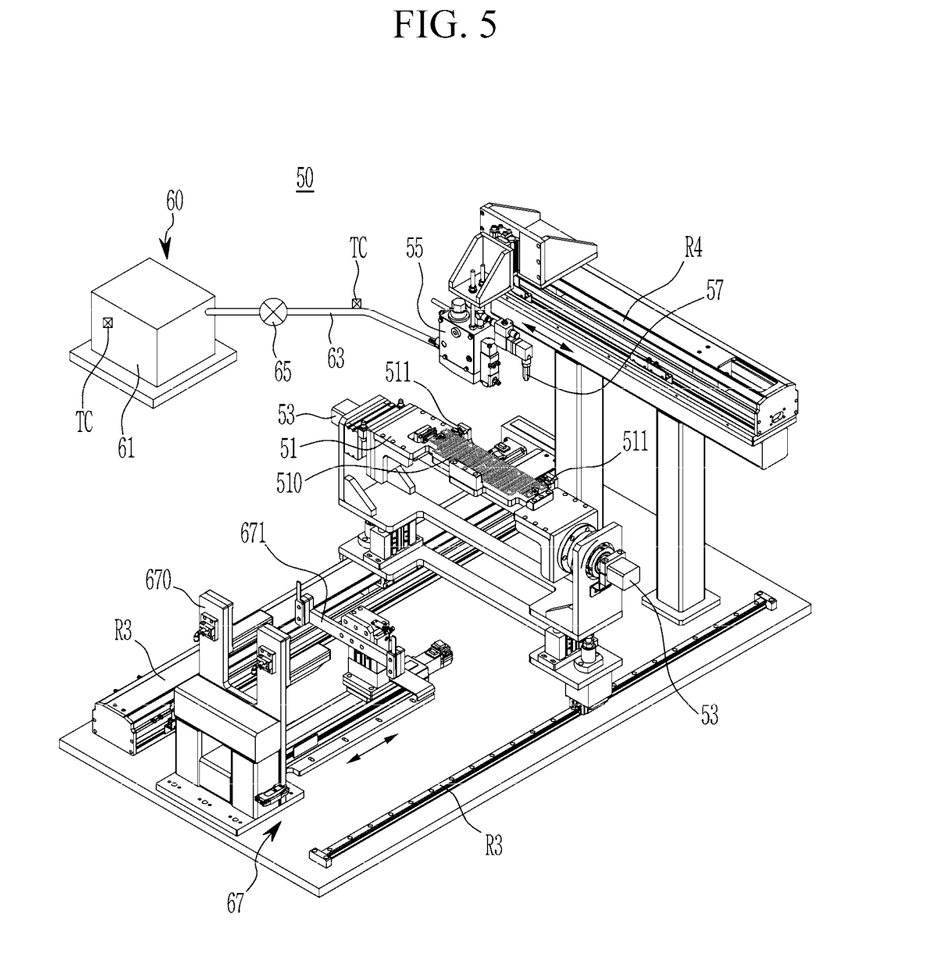
FIG. 5 is a schematic diagram of a battery cell adhesion unit applied to a system for assembling a battery module according to an exemplary embodiment.

FIG. 5 is a schematic diagram of a battery cell adhesion unit 50 applied to a system for assembling a battery module according to an exemplary embodiment.

In an exemplary embodiment, the battery cell adhesion unit 50 is disposed adjacent to the battery cell supply unit 20 (refer to FIG. 3).

The battery cell adhesion unit 50 is configured to place the battery cells 3 transferred by the transfer unit 40 on a rotation frame 51 to apply the adhesive 13 to the battery cells 3, and to conjoin the battery cells 3 while stacking the battery cells 3 in a stacking device 67 such that the adhesion surfaces 11 applied with the adhesive 13 face a preset direction.

First, the battery cells 3 are firmly seated on the rotation frame 51.

The rotation frame 51 may be configured to be slide-movable and rotatable to transfer the battery cell 3 to a preset position.

The rotation frame 51 includes a seating plate 510 on which the battery cell 3 is seated, and clampers 511 configured to clamp the battery cell 3 at a circumference of the seating plate 510.

The rotation frame 51 places the battery cells 3 on the seating plate 510, and then firmly holds the battery cell by the clampers 511.

In addition, the rotation frame 51 is configured to be slidable on a third rail R3 formed along an applier 55 and the stacking device 67.

At this time, the rotation frame 51 is configured to rotate by 90 degrees around a horizontal axis by a rotation motor 53 configured on both sides, for example, symmetrically as shown in FIG. 5.

That is, when the battery cell 3 is seated on the seating plate 510, the rotation frame 51 may be rotated by the operation of the rotation motor 53 such that the adhesion surface 11 of the battery cell 3 may face, for example, upward to the front side.

The applier 55 is provided on the rotation frame 51.

The applier 55 is configured to apply the adhesive 13 to the adhesion surface 11 of the battery cell 3 fixed to the rotation frame 51 by the nozzle 57.

At this time, the applier 55 may be configured to apply the adhesive 13 the adhesion surface 11 by a preset pattern.

For example, the preset pattern may have various forms, for example, a lengthy form on the adhesion surface 11 along a length direction of the battery cell 3 or along an edge of the adhesion surface 11, a form generally along a width direction of the battery cell 3, a form covering an entire surface of the adhesion surface 11, and the like.

That is, the applier 55 may be configured to set the application area depending on the size of the battery cell 3, and may set the amount of the adhesive 13 to be applied on the adhesion surface 11.

The applier 55 is configured to be slidable on a fourth rail R4 disposed along a length direction of the rotation frame 51.

The applier 55 connected to the adhesive storage unit 60 that supplies the adhesive 13 to the battery cell adhesion unit 50.

The adhesive storage unit 60 includes a storage tank 61 that stores the adhesive 13.

The storage tank 61 is provided with a temperature controller TC to maintain a constant temperature of the adhesive 13.

The adhesive 13 may be maintained to a preset temperature, e.g., a temperature at which the adhesive remains in a liquid state, and the temperature of the adhesive 13 in the storage tank 61 may be maintained to the constant temperature based on the temperature controller TC.

In addition, the storage tank 61 is connected to the nozzle 57 a supply hose 63.

The supply hose 63 is disposed between the storage tank 61 and the nozzle 57 to supply the adhesive 13 to the nozzle 57, and the same as with the storage tank 61, is provided with another temperature controller TC for maintaining the constant temperature of the adhesive 13.

A supply pump 65 is installed on the supply hose 63.

The supply pump 65 is configured to supply the adhesive 13 to the nozzle 57 by a preset amount.

In addition, the stacking device 67 is provided in an opposite side of the applier 55 in front and rear directions interposing the rotation frame 51.

That is, the battery cell adhesion unit 50 is configured to stack the battery cells 3 in the stacking device 67 while the rotation frame 51 moves between the applier 55 and the stacking device 67, when the adhesive 13 is applied to the battery cells 3 by the applier 55.

The stacking device 67 may stack the battery cells 3 while the battery cells 3 are supported by a fixed plate 670 and the adhesion surfaces 11 of the battery cells 3 face a preset direction by slide-movement and rotation of the rotation frame 51.

At this time, the fixed plate 670 may be configured to support the battery cells 3 by vacuum adsorption.

The stacking device 67 may further include a pressurizing device 671 configured to pressurize the battery cell 3 toward the fixed plate 670 while moving in the front and rear directions with respect to the fixed plate 670.

In detail, after the battery cell 3 is seated on the seating plate 510 of the rotation frame 51 such that the adhesion surface 11 face upward, the adhesive 13 is applied on the adhesion surface 11 by the applier 55. Then, the adhesion surface 11 applied with the adhesive 13 may be positioned to face forward (i.e., toward the front) by the rotation of the rotation frame 51, and then the battery cell 3 may be stacked in the stacking device 67. However, this is not limited in an embodiment, and it may be understood that direction and position of stacking the battery cells 3 may be varied depending on various factors such as application direction of the adhesive 13, size of the battery cell 3, and so on.

At this time, the battery cells 3 are pressurized toward the fixed plate 670 by the pressurizing device 671.

Figure 6:
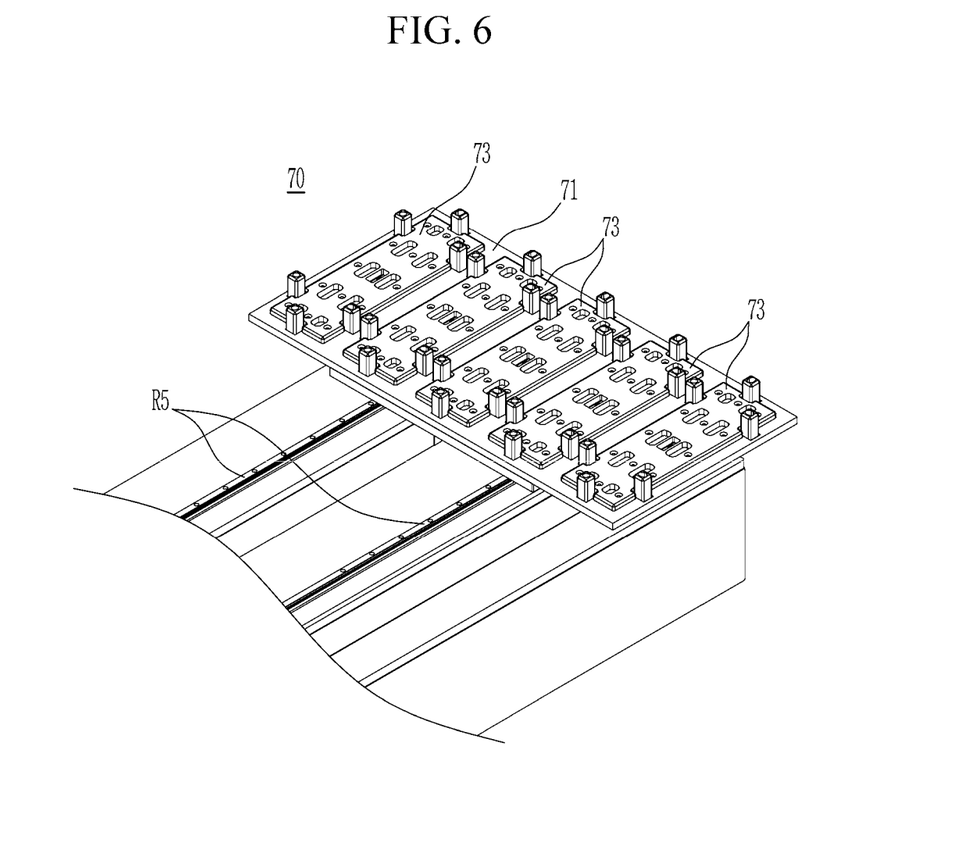
FIG. 6 is a schematic diagram of a pad supply unit applied to a system for assembling a battery module according to an exemplary embodiment.

FIG. 6 is a schematic diagram of the pad supply unit 70 applied to a system for assembling a battery module according to an exemplary embodiment.

Referring to FIG. 6, in an exemplary embodiment, the pad supply unit 70 is disposed at a rear of the battery cell supply unit 20, and is configured to operate in the front and rear directions with respect to the battery cell supply unit 20.

At this time, the pads 15 are optionally added between the battery cells 3, and are configured to prevent the swelling phenomena that the battery cell 3 swells while the battery module 1 is being used.

The pad supply unit 70 includes a movable plate 71 configured to operate in the front and rear directions on a fifth rail R5 with respect to the battery cell supply unit 20.

In addition, a plurality of pad storages 73 configured to store the pads 15 may be seated may be disposed in parallel on upper surface of the movable plate 71.

Each pad storage 73 may store a plurality of pads 15 are stored, and the transfer unit 40 may adsorb the pad 15 to add the pad 15 to the battery cells 3 seated in the battery cell adhesion unit 50.

At this time, when the pad 15 is conjoined to the battery cells 3, the battery cells 3 together with the pad 15 are stacked in the stacking device 67.

The pads 15 and the battery cells 3 stacked in the stacking device 67 may be transferred to a subsequent process, and then packaged by the exterior member 10 to form the battery module 1.

Therefore, by a system for assembling a battery module according to an exemplary embodiment, the adhesive 13 made of a liquid is applied between the battery cells 3 constituting the battery module 1, and by supplying a precise amount of the adhesive 13 corresponding to a preset amount, the adhesive 13 may be uniformly applied, thereby improving the marketability.

That is, according to the system for assembling a battery module, by applying the adhesive 13 in the required amount according to the required area, there is an advantage in quality management by maintaining a uniform quality.

In addition, according to a system for assembling a battery module according to an exemplary embodiment, when the adhesive 13 is insufficient, by replacing the storage tank 61 storing the adhesive 13, or by filling the storage tank 61 with the adhesive 13, the replacement time of consumable materials may be reduced and production efficiency may be increased.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A system for assembling a battery module, comprising:
a battery cell supply unit configured to stack a plurality of battery cells, each battery cell being formed by packaging of a negative electrode plate having a negative electrode terminal, a positive electrode plate having a positive electrode terminal, and a separator interposed between the negative electrode plate and the positive electrode plate, in an exterior member;
a transfer unit configured to adsorb and transfer the battery cell from the battery cell supply unit; and
a battery cell adhesion unit configured to apply an adhesive to an adhesion surface of each of the plurality of battery cells transferred by the transfer unit, and to conjoin the battery cells while stacking the plurality of battery cells in a stacking device such that each of the adhesion surfaces of the battery cells face a preset direction;
wherein the transfer unit comprises:
an adsorber configured to vacuum adsorb each of the plurality of battery cells stored in the battery cell supply unit;
a vertical motor connected to the adsorber through a vertical shaft and configured to vertically move the adsorber;
a first rail on which the vertical motor is slidably mounted through a motor bracket, the first rail being configured to reciprocally move the adsorber together with the vertical motor in a first horizontal direction; and a second rail disposed at both end portions of the first rail, the second rail being configured to reciprocally move the first rail in a second horizontal direction.

2. The system of claim 1, wherein the battery cell supply unit comprises:

at least one loading frame on which the plurality of battery cells are seated such that each of the adhesion surfaces of the battery cells face upward;

a height adjusting device disposed below the loading frame, and configured to operate vertically at a central portion under the loading frame, to adjust a loading height of each of the plurality of battery cells;

a detecting sensor disposed on a first side of the loading frame, and configured to detect a loading position of each of the plurality of battery cells; and a barcode reading sensor disposed on a second side of the loading frame, and configured to recognize a barcode of each of the plurality of battery cells.

3. A system for assembling a battery module, comprising:

a battery cell supply unit configured to stack a plurality of battery cells, each battery cell being formed by packaging of a negative electrode plate having a negative electrode terminal, a positive electrode plate having a positive electrode terminal, and a separator interposed between the negative electrode plate and the positive electrode plate, in an exterior member;

a transfer unit configured to adsorb and transfer the battery cell from the battery cell supply unit; and a battery cell adhesion unit configured to apply an adhesive to an adhesion surface of each of the plurality of battery cells transferred by the transfer unit, and to conjoin the battery cells while stacking the plurality of battery cells in a stacking device such that each of the adhesion surfaces of the battery cells face a preset direction;

wherein the battery cell adhesion unit comprises:

a rotation frame on which each of the battery cells transferred by the transfer unit are seated, the rotation frame being configured to slide and rotate to transfer each of the battery cells to a preset position;

an applier disposed on the rotation frame, the applier being configured to apply the adhesive to the adhesion surface of each of the battery cells fixed to the rotation frame by a nozzle; and the stacking device configured to stack the plurality of battery cells while the plurality of battery cells are supported by a fixed plate, and wherein the adhesion surfaces of the plurality of battery cells face the preset direction by sliding and rotating of the rotation frame.

4. The system of claim 3, wherein the rotation frame comprises:

a seating plate on which each of the battery cells is seated; and clampers configured to clamp each of the battery cells at a circumference of the seating plate, wherein the rotation frame is configured to be slidable on a third rail formed along the applier and the stacking device.

5. The system of claim 3, wherein the rotation frame is configured to rotate by 90° by a rotation motor configured on both sides.

6. The system of claim 3, wherein the applier is connected to an adhesive storage unit configured to store the adhesive to be supplied to the battery cell adhesion unit, and is configured to be slidable on a fourth rail disposed along a length direction of the rotation frame.

7. The system of claim 6, wherein the adhesive storage unit comprises:

a storage tank configured to store the adhesive and having a temperature controller for maintaining a constant temperature of the adhesive;

a supply hose disposed between the storage tank and the nozzle to supply the adhesive to the nozzle, and having a second temperature controller for maintaining the constant temperature of the adhesive; and a supply pump installed on the supply hose, the supply pump being configured to supply the adhesive to the nozzle by a preset amount.

8. The system of claim 3, wherein the stacking device further comprises a pressurizing device configured to pressurize each of the plurality of battery cells toward the fixed plate while moving in front and rear directions with respect to the fixed plate.

9. The system of claim 1, further comprising a pad supply unit configured to operate in front and rear directions with respect to the battery cell supply unit, the pad supply unit being further configured to store pads to be attached between the plurality of battery cells.

10. A system for assembling a battery module, comprising:

a battery cell supply unit configured to stack a plurality of battery cells, each battery cell being formed by packaging of a negative electrode plate having a negative electrode terminal, a positive electrode plate having a positive electrode terminal, and a separator interposed between the negative electrode plate and the positive electrode plate, in an exterior member;

a transfer unit configured to adsorb and transfer the battery cell from the battery cell supply unit;

a battery cell adhesion unit configured to apply an adhesive to an adhesion surface of each of the plurality of battery cells transferred by the transfer unit, and to conjoin the battery cells while stacking the plurality of battery cells in a stacking device such that each of the adhesion surfaces of the battery cells face a preset direction; and a pad supply unit configured to store pads;

wherein the pad supply unit comprises:

a movable plate configured to operate in front and rear directions on a fifth rail with respect to the battery cell supply unit; and a plurality of pad storages configured to store the pads disposed in parallel on an upper surface of the movable plate.

* * * * *